United States Patent
Kobayashi et al.

(10) Patent No.: US 11,843,292 B2
(45) Date of Patent: Dec. 12, 2023

(54) METHOD FOR MANUFACTURING STATOR

(71) Applicant: Hitachi Astemo, Ltd., Hitachinaka (JP)

(72) Inventors: Hideaki Kobayashi, Ibaraki (JP); Yoshio Ozeki, Ibaraki (JP); Daisuke Kitajima, Ibaraki (JP); Toshiyuki Takano, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 194 days.

(21) Appl. No.: 17/424,956

(22) PCT Filed: Jan. 8, 2020

(86) PCT No.: PCT/JP2020/000230
§ 371 (c)(1),
(2) Date: Jul. 22, 2021

(87) PCT Pub. No.: WO2020/162088
PCT Pub. Date: Aug. 13, 2020

(65) Prior Publication Data
US 2022/0094248 A1    Mar. 24, 2022

(30) Foreign Application Priority Data
Feb. 7, 2019    (JP) .................................. 2019-20331

(51) Int. Cl.
*B29C 45/14*    (2006.01)
*H02K 15/12*    (2006.01)
(Continued)

(52) U.S. Cl.
CPC ............. *H02K 15/12* (2013.01); *B29C 45/14* (2013.01); *B29C 45/72* (2013.01);
(Continued)

(58) Field of Classification Search
CPC ........................ B29C 2045/7343; B29C 45/72
See application file for complete search history.

(56) References Cited

U.S. PATENT DOCUMENTS 5,474,799 A * 12/1995 Thigpen ................ H01F 41/127
 118/313
5,685,910 A * 11/1997 Thigpen ................ H02K 15/12
 118/712

FOREIGN PATENT DOCUMENTS

JP    53-32302 A    3/1978
JP    S59-139839 A    8/1984
(Continued)

OTHER PUBLICATIONS

Machine English translation of JP2008-109732 provided by Google Patents (Year: 2023).*

(Continued)

*Primary Examiner* — Edmund H Lee
(74) *Attorney, Agent, or Firm* — Foley & Lardner LLP

(57) ABSTRACT

An object of the present invention is to suppress an outflow of varnish from a lower portion of a stator core by increasing a filling rate of varnish in a slot. Provided is a method for manufacturing a stator of a rotary electric machine. The stator has a coil and a stator core in which a slot that houses the coil is formed, and a resin member of which viscosity is low at a first temperature and the viscosity is high at a second temperature higher than the first temperature is filled in the slot from an injection side. The manufacturing method includes a first step of causing a temperature difference in the stator core such that the injection side becomes the first temperature and an opposite side of the injection side becomes the second temperature, and a second step of injecting the resin member from the injection side in a state in which the temperature difference is maintained.

4 Claims, 5 Drawing Sheets

(51) Int. Cl.
   *B29C 45/72* (2006.01)
   *B29L 31/00* (2006.01)
   *B29C 45/73* (2006.01)
(52) U.S. Cl.
   CPC ................ *B29C 2045/1486* (2013.01); *B29C 2045/7343* (2013.01); *B29L 2031/7498* (2013.01)

(56) References Cited

FOREIGN PATENT DOCUMENTS

| | | |
|---|---|---|
| JP | H06-209548 A | 7/1994 |
| JP | H10-257726 A | 9/1998 |
| JP | 2008-109732 A | 5/2008 |
| JP | 2011-62036 A | 3/2011 |
| JP | 2011-139588 A | 7/2011 |
| JP | 2013-192357 A | 9/2013 |
| JP | 2015-126645 A | 7/2015 |
| JP | 2016-127781 A | 7/2016 |
| JP | 2019-170105 A | 10/2019 |

OTHER PUBLICATIONS

International Search Report with English translation and Written Opinion issued in corresponding application No. PCT/JP2020/000230 dated Mar. 10, 2020.
JP Office Action with English Translation App. No. 2020-571046, dated Apr. 19, 2022 (6 pages).

\* cited by examiner

METHOD FOR MANUFACTURING STATOR

TECHNICAL FIELD

The present invention relates to a method for manufacturing a stator that constitutes a rotary electric machine and around which a coil is wound.

BACKGROUND ART

As a background art of this technical field, there is the following related art. According to PTL 1 (JP 2008-109732 A), in a first supply step after preheating, a stator core is held horizontally in a pose in which coil ends of a coil attached to the stator core go up and down, varnish is injected from an upper surface of an upper coil end of the coil protruding from an upper end surface of the stator core, and the varnish is supplied while controlling a supply amount such that the varnish with which the upper coil end is impregnated and that flows down from the top of the upper coil end gels before reaching an outside of a lower coil end of the coil protruding from a lower end surface of the stator core. Thereafter, in an inversion step, the stator core to which the coil is attached is inverted at intervals equal to or longer than a time when the varnish last supplied in the first supply step gels. In a second supply step after the inversion step, the varnish is supplied by controlling the supply amount such that the gelling is started near a position at which the gelling is started in the first supply step. Thereafter, the varnish impregnated in the coil is heat-retained and cured.

CITATION LIST

Patent Literature

PTL 1: JP 2008-109732 A

SUMMARY OF INVENTION

Technical Problem

In the stator of the rotary electric machine, it is desired to increase a filling rate of the varnish in the slot in order to fix the coil to be wound. Thus, it is necessary to inject a large amount of varnish, but when the varnish flows out from a lower side of the stator core, the filling rate decreases. Accordingly, for example, in the method described in PTL 1, the varnish is injected in different directions in the first supply step and the second supply step, but since the inversion step is included between the first supply step and the second supply step, and a work is complicated.

Thus, there is a demand for a method for manufacturing a stator having a high filling rate of the varnish in the slot.

Solution to Problem

A typical example of the invention disclosed in the present application is as follows. That is, there is provided a method for manufacturing a stator of a rotary electric machine. The stator has a coil and a stator core in which a slot that houses the coil is formed, and a resin member of which viscosity is low at a first temperature and the viscosity is high at a second temperature higher than the first temperature is filled in the slot from an injection side. The manufacturing method includes a first step of causing a temperature difference in the stator core such that the injection side becomes the first temperature and an opposite side of the injection side becomes the second temperature, and a second step of injecting the resin member from the injection side in a state in which the temperature difference is maintained.

Advantageous Effects of Invention

According to one aspect of the present invention, the filling rate of the varnish in the slot can be increased, and the varnish can be prevented from flowing down from the lower side of the stator core. Other objects, configurations, and effects will be made apparent in the following descriptions of the embodiments.

DESCRIPTION OF EMBODIMENTS

Figure 1:
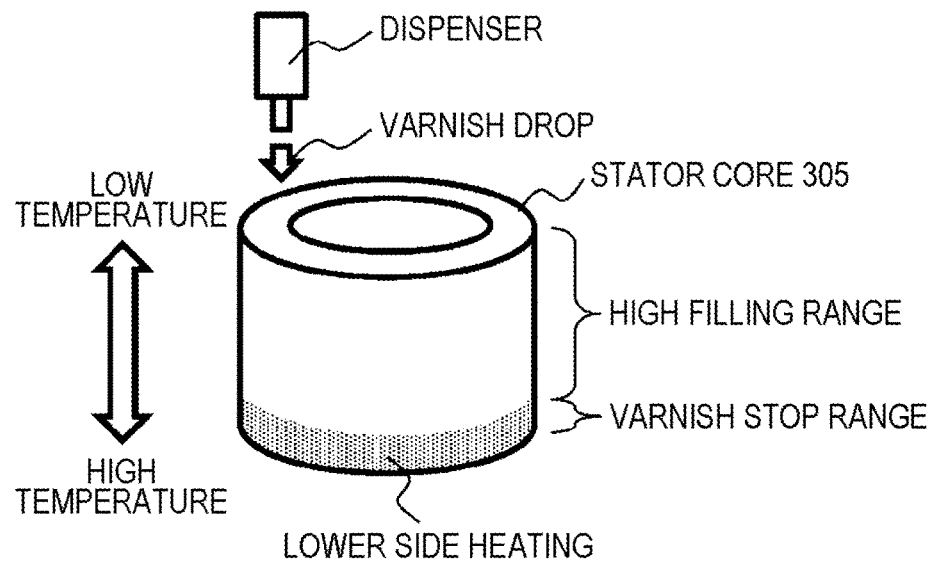
FIG. 1 is a diagram illustrating an outline of a method for manufacturing a stator according to an embodiment of the present invention.

FIG. 1 is a diagram illustrating an outline of a method for manufacturing a stator according to an embodiment of the present invention.

In the method for manufacturing the stator according to the present embodiment, varnish is injected into a stator core 305 from above (welded end side illustrated in FIG. 3) with a dispenser, and the varnish is injected from a low temperature side (above) in a state in which a temperature difference is caused such that an upper portion of the stator core 305 is a low temperature (high-speed filling temperature range) and a lower portion thereof becomes a high temperature (gelling temperature range) by heating the lower portion of the stator core 305 (or cooling an upper portion of the stator core 305). The varnish injected into slots 310 of the stator core 305 is an example of an insulating resin member, and may be an insulating resin member having another name.

Accordingly, since the high temperature region in the lower portion of the stator core 305 is set to a temperature at which the varnish gels and viscosity becomes high, a varnish stop range in which the injected varnish does not flow out from the lower portion of the stator core 305 is formed. On the other hand, since the low temperature region of the upper portion of the stator core 305 to an intermediate temperature region of an intermediate portion thereof are temperatures at which the viscosity of the varnish is low, the injected varnish stays above the varnish stop range and the varnish is injected with a high filling rate. Thus, in the high filling range, the number of bubbles between the stator core 305 and a coil is reduced. Thus, heat generated in the coil is easily released, vibration of the coil can be suppressed, and characteristics of a rotary electric machine are stabilized.

Next, a structure of the stator core 305 according to the embodiment of the present invention will be described.

Figure 2:
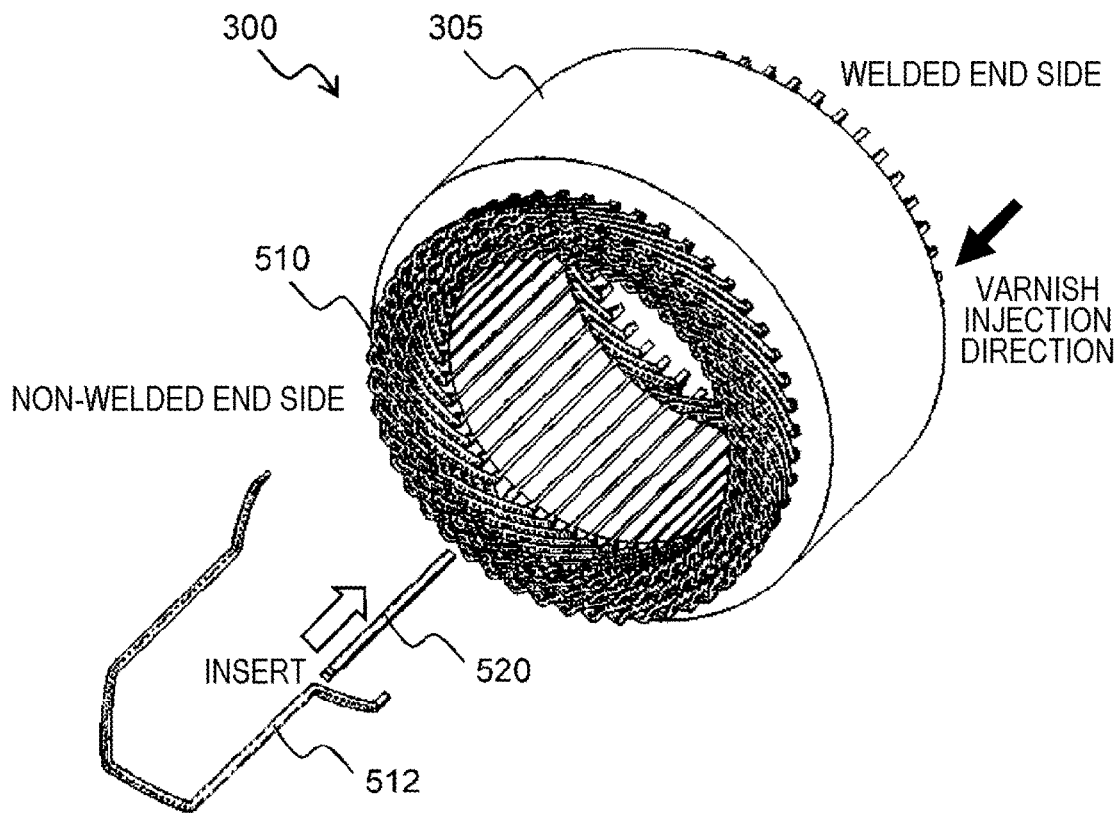
FIG. 2 is a perspective view illustrating a stator core on which a coil is mounted.
Figure 3:
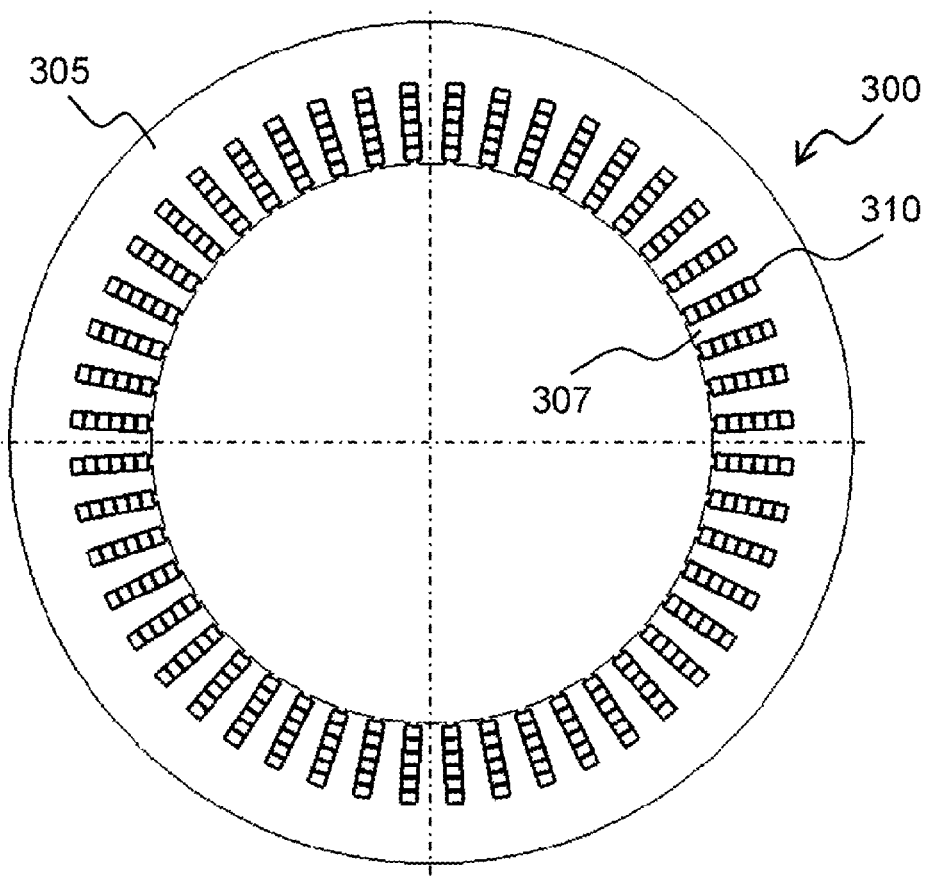
FIG. 3 is a sectional view of the stator core on which the coil is mounted as viewed from a welded end side.
Figure 4:
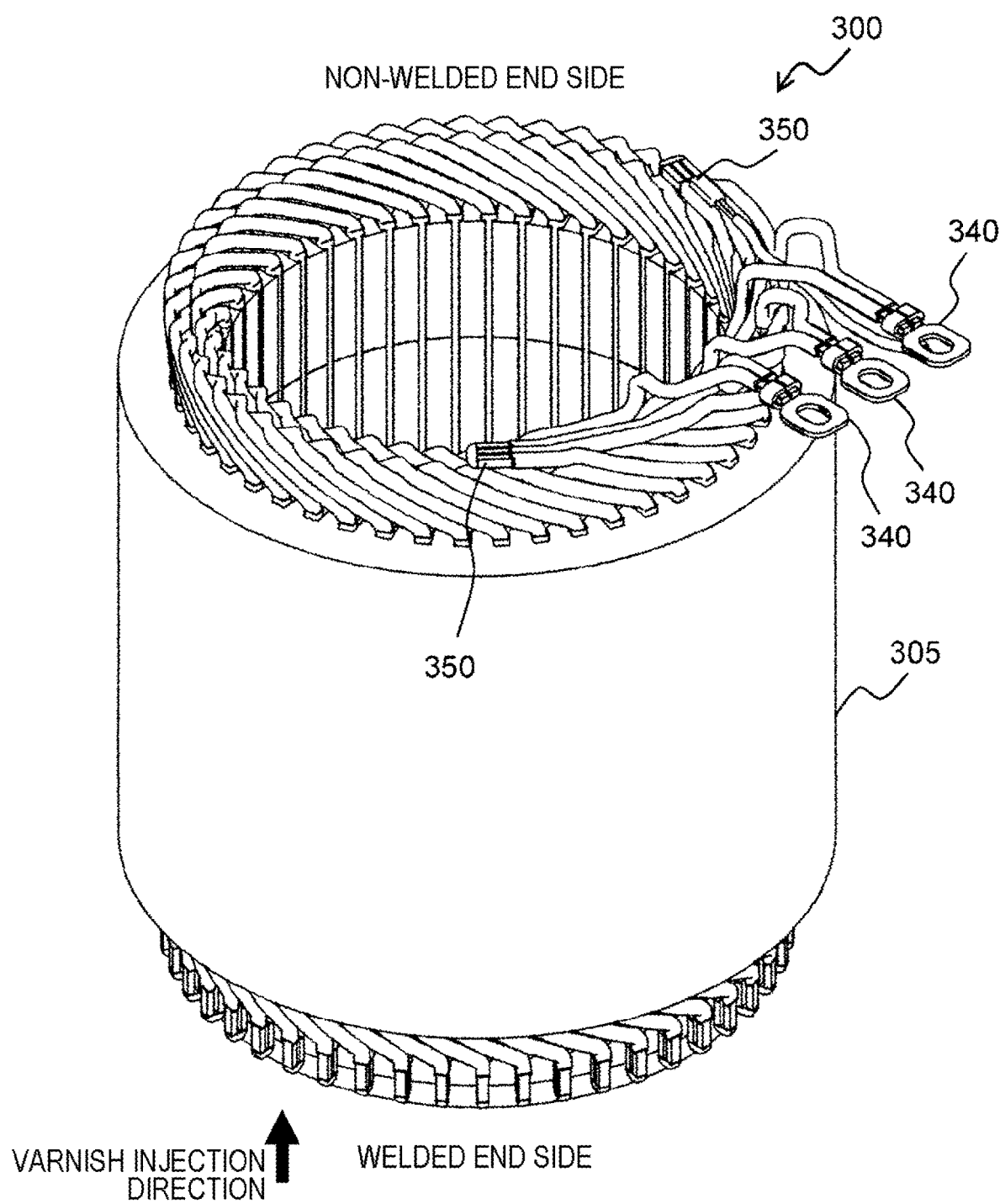
FIG. 4 is a perspective view of the stator core on which the coil is mounted as viewed from a non-welded end side.

FIG. 2 is a perspective view illustrating the stator core 305 on which the coil is mounted, FIG. 3 is a sectional view of the stator core 305 on which the coil is mounted as viewed from the welded end side, and FIG. 4 is a sectional view of the stator core 305 on which the coil is mounted as viewed from a non-welded end side.

A stator 300 of the rotary electric machine 200 is constituted by a cylindrical stator core 305 and stator coils 510 and slot liners 520 inserted into the stator core 305.

The stator core 305 is supported inside a housing 205, and a rotor in which a permanent magnet is embedded is rotatably supported on an inner peripheral side of the stator core 305 via a gap. The stator core 305 is formed by stacking a plurality of magnetic materials (for example, a plurality of electromagnetic steel plates) in an axial direction. A plurality of teeth 307 and the slots 310 are formed at equal intervals in a circumferential direction, and each tooth 307 is integrated with an annular core back. In FIG. 3, all teeth are not assigned by reference signs, and only some teeth cores 307 are representatively assigned by reference signs. A plurality of slots 310 is continuously formed in the circumferential direction between the adjacent teeth cores 307 so as to be closer to the rotor, respectively. Slot insulation (not illustrated) due to the slot liner 520 is provided in the slot 310, and coils having multiple phases such as a U phase, a V phase, and a W phase constituting the stator 300 are attached.

As illustrated in FIG. 2, the stator coil 510 is housed in the slot 310 of the stator core 305. In the example illustrated in FIG. 2, the slot 310 is an open slot, and an opening is formed on the inner peripheral side of the stator core 305. As illustrated in FIG. 3, a width of an opening formed on the innermost circumference of the slot 310 in the circumferential direction is substantially equal to a width of a coil attachment portion of each slot 310 to which the stator coil 510 is attached or is slightly smaller than the coil attachment portion.

The slot liner 520 is arranged in each slot 310. The slot liner 520 is, for example, an insulating sheet made of a heat-resistant resin, and has a thickness of about 0.1 to 0.5 mm. The slot liners 520 are arranged in the slots 310, and thus, a withstand voltage between the coils inserted into the slots 310 and between the coil and an inner surface of the slot 310 is improved. A required withstand voltage is retained even though an insulating film of the coil is deteriorated or damaged.

Gaps between the coil in the slot 310 and the stator core 305 differs in the circumferential direction and a radial direction of the stator core 305 in order to improve insertability of the coil, and one gap is larger than the other gap. There is a trade-off between coil insertability and coil space factor which are determined by a size of the gap. In the present embodiment, the varnish injected into the slots 310 is held by the slot liners 520. That is, the slot liner 520 serves as a varnish holding member. Insulation between the coils and insulation between the coil and the stator core 305 are enhanced by the varnish, and the stator coil 510 is fixed in the slot 310. The movement of the stator coil 510 in the slot 310 is suppressed due to the vibration applied to the rotary electric machine 200 and electromagnetic vibration of the stator coil 510.

As illustrated in FIG. 2, in the stator core 305 according to the present embodiment, a plurality of segment coils 512 formed by molding a rectangular wire of which an outer periphery is covered with an insulating film into a U shape is housed in two slots 310 separated by each other such that end portions thereof are exposed from the slots 310 (that is, the stator core 305), and is arranged such that one end portion is adjacent to the other segment coil 512 and the other end portion is adjacent to the other segment coil 512. The segment coil 512 is disposed in each slot 310 such that, for example, a rectangular cross section of the coil is long in the circumferential direction of the stator core 305 and short in the radial direction. The end portions of the segment coil 512 are connected to each other on the welded end side (right back side in FIG. 2), and thus, the stator coil 510 wound around the stator core 305 in distributed winding is formed.

As illustrated in FIG. 4, a connection terminal 340 and a thermistor 350 are provided on the non-welded end side of the stator 300. The connection terminal 340 is provided at the end portion of the coil having the multiple phases such as the U phase, the V phase, and the W phase, and is connected to a driver of a control circuit (not illustrated). The thermistor 350 measures a temperature of the coil. The temperature of the coil measured by the thermistor 350 is input to the control circuit.

Figure 5:
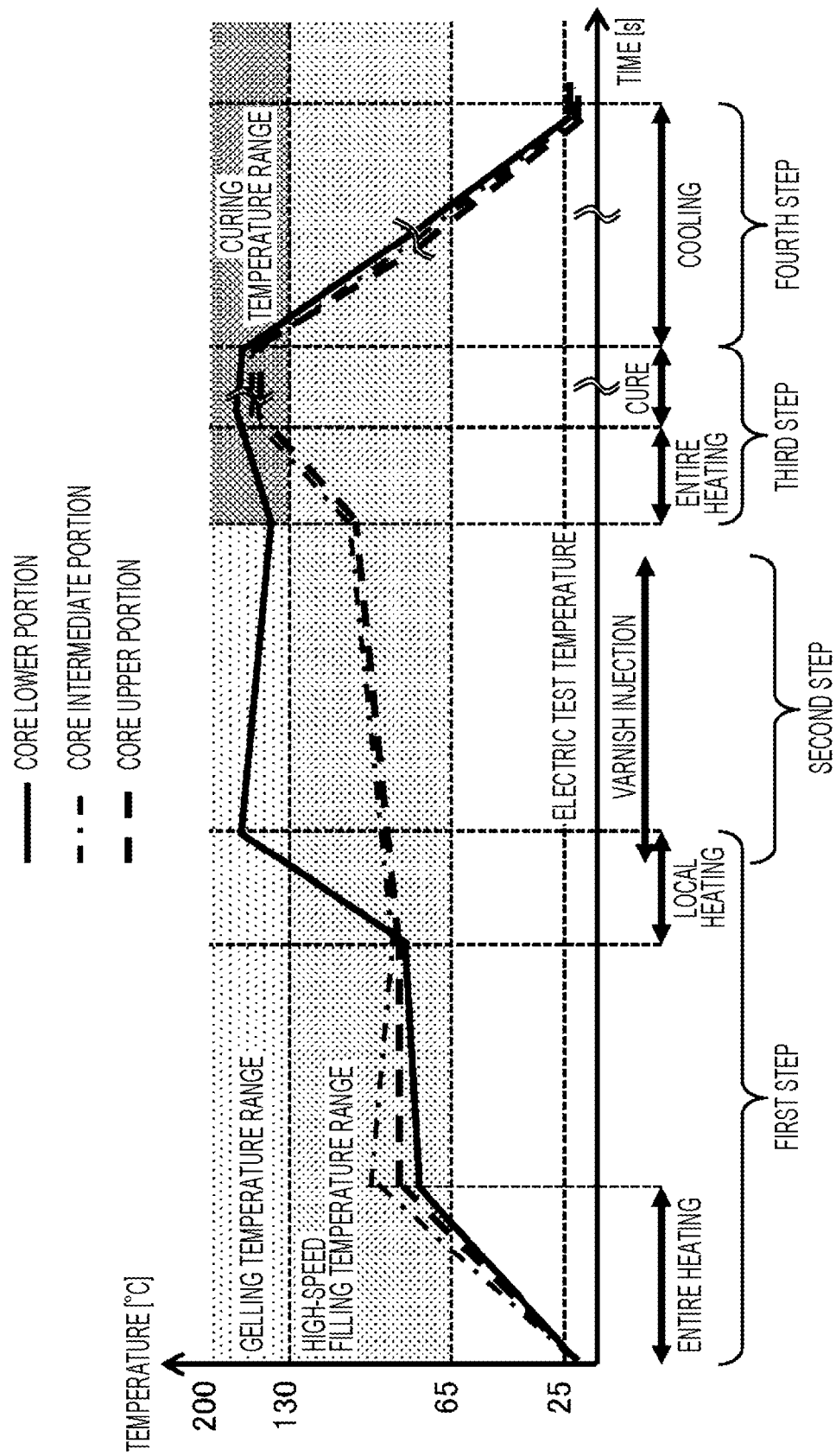
FIG. 5 is a diagram illustrating a temperature change in a procedure of manufacturing the stator.

FIG. 5 is a diagram illustrating a temperature change in a procedure of manufacturing the stator 300 according to the present embodiment, in which a vertical axis represents a temperature and a horizontal axis represents an elapsed time.

In the present embodiment, since the varnish is injected from the welded end side of the stator core 305, the welded end side is the upper portion and the non-welded end side is the lower portion.

First, the entire stator core 305 is heated from a room temperature to a high-speed filling temperature range. Although the high-speed filling temperature range depends on a material of the varnish, the high-speed filling temperature range is 65° C. to 130° C. in the present embodiment. For example, since the stator core 305 is formed of an iron plate, the stator core may be heated with an IH heater having an electrode inserted in a cavity (a portion into which the rotor is inserted) in the stator core 305.

Thereafter, the lower portion (non-welded end side) of the stator core 305 is locally heated to the gelling temperature range. In the present embodiment, the gelling temperature range is 130° C. or higher. For example, the stator core may be heated by an IH heater having an electrode close to the lower portion of the stator core 305. Due to this local heating, the lower portion of the stator core 305 has a higher temperature than from intermediate portion to the upper portion (welded end side) of the stator core 305, and a temperature difference is caused in the stator core 305. Thus, the varnish stop range is formed in the lower portion of the stator core 305, and the high filling range is formed from the intermediate portion to the upper portion of the stator core 305 (the above, first step).

In a method for causing the temperature difference, the temperature difference may be caused in the stator core 305 such that from the intermediate portion to the upper portion of the stator core 305 becomes lower temperature (high-speed filling temperature range) than the lower portion of the stator core 305 by heating the stator core 305 to the gelling temperature range once instead of locally heating the lower portion of the stator core 305 and then cooling from the intermediate portion to the upper portion of the stator core 305 (for example, with spot cooler).

In a state in which a predetermined amount of temperature difference (the lower portion of the stator core 305 is the gelling temperature range and from the intermediate portion to the upper portion is the high-speed filling temperature range) is maintained, varnish is injected to the slot 310 from the upper portion of the stator core 305. When the varnish flowing down in the slots 310 of the stator core 305 reaches the lower portion of the stator core 305 (the varnish stop range which is the gelling temperature range), the varnish gels and stops without flowing out from a lower end of the stator core 305, and the filling rate of the varnish is low in this region. Thereafter, the injection of the varnish is continued, and the varnish is injected to an upper end of the stator core 305 (the above, second step). Since from the intermediate portion to the upper portion of the stator core 305 is in the high-speed filling temperature range, fluidity of the injected varnish is high. Thus, a sufficient amount of varnish can be filled between the coils and inner walls of the slots 310, and the filling rate of the varnish becomes high.

Figure 6:
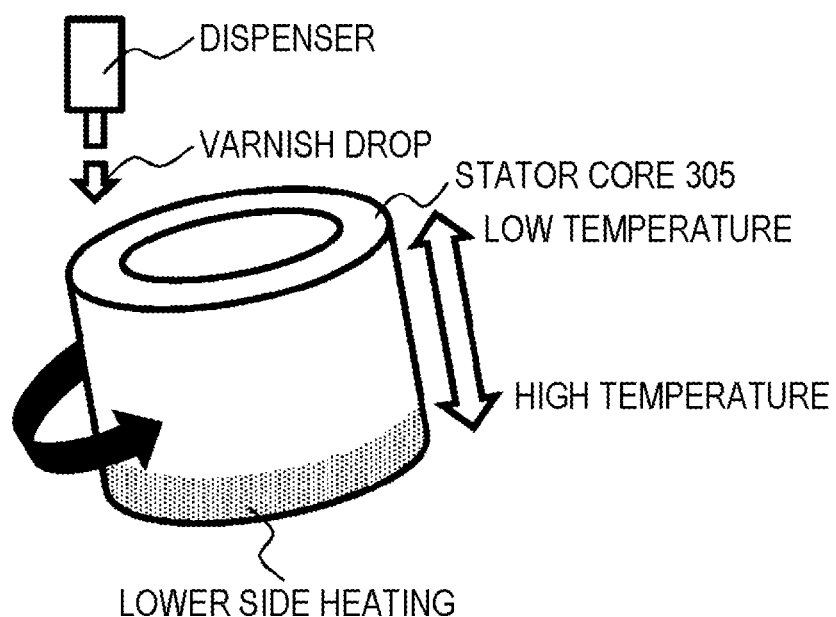
FIG. 6 is a diagram illustrating the stator core when varnish is injected.

When the varnish is injected, a shaft of the stator core 305 may be tilted from the vertical as illustrated in FIG. 6. An inflow rate of the varnish can be controlled by tilting the stator core 305 to inject the varnish.

Figure 7:
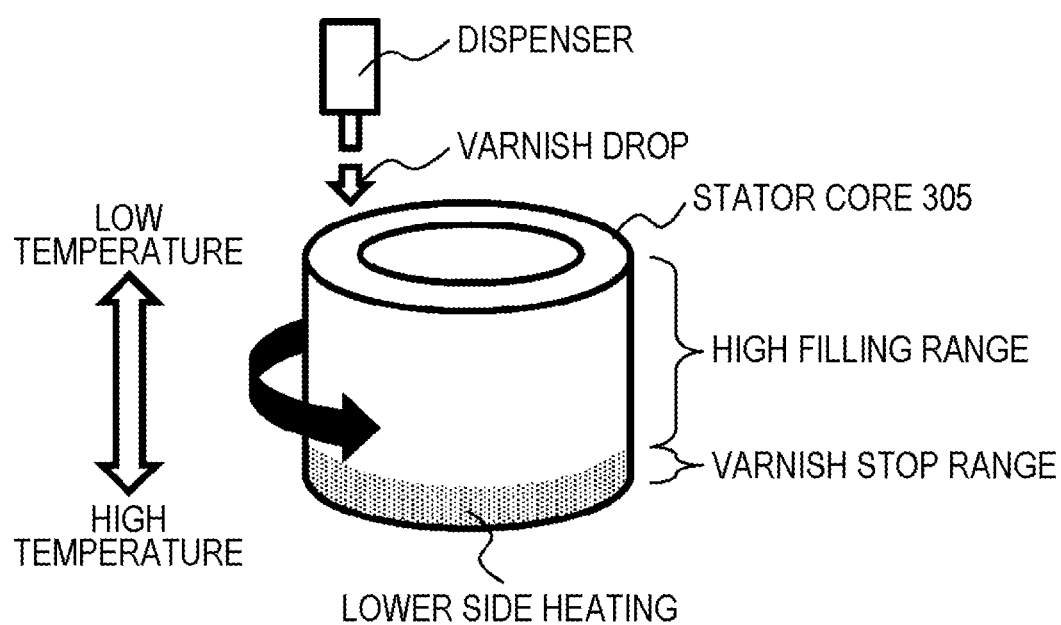
FIG. 7 is a diagram illustrating the stator core when the varnish is injected.

As illustrated in FIGS. 6 and 7, the varnish may be injected while rotating, revolving, or swinging the stator core 305. The varnish is injected while rotating or revolving the stator core 305, and thus, relative positions of the stator core 305 and the dispenser change. Accordingly, the varnish can be injected uniformly in the circumferential direction. In particular, when the varnish is injected with the stator core 305 being tilted, the varnish can be filled without bias. The varnish is injected while moving the stator core 305 by rotating, revolving, or swinging, and thus, residual bubbles can be suppressed. The varnish can be filled with a high filling rate. The stator core 305 may be rotated or revolved, but when the varnish is injected in a state in which the shaft of the stator core 305 is vertical, the dispenser may move.

After filling of a predetermined amount of varnish is ended, the entire stator core 305 is heated to a curing temperature range. For example, since the stator core 305 is made of the iron plate, the stator core may be heated with the IH heater having the electrode inserted in the cavity (the portion into which the rotor is inserted) in the stator core 305. Although the curing temperature range depends on a material of the varnish, the curing temperature range is 130° C. or higher in the present embodiment. The varnish is further cured and solidified from a gel state by leaving the stator core 305 in the curing temperature range for a long time (the above, third step).

Thereafter, the stator core 305 on which the varnish is cured is cooled to a room temperature (hereinafter, an electric test temperature) (above, fourth step).

In the present embodiment, since the varnish gels in the varnish stop range of the lower portion of the stator core 305 and stops at the lower portion of the stator core 305, the varnish does not flow out from the lower end of the stator core 305. Thus, the filling rate of the varnish in the high filling range from the intermediate portion to the upper portion of the stator core 305 can be increased.

The stator 300 has a portion at which the varnish is prevented from adhering. According to the method for manufacturing the stator according to the present embodiment, since the outflow of the varnish from the lower end of the stator core 305 can be prevented, the adhesion of the varnish to a varnish adhesion prohibited region can be suppressed. For example, as illustrated in FIG. 4, the varnish is prohibited from adhering to the connection terminal 340 and thermistor 350 provided on the non-welded end side (lower side when the varnish is injected) of the stator 300. Since the connection terminal 340 connects the coil and the control circuit, the varnish attached to a surface thereof insulates the coil and the control circuit. The varnish is prevented from adhering to the connection terminal 340, and thus, it is possible to suppress poor continuity between the rotary electric machine and the control circuit. Although the thermistor 350 needs to be in close contact with the coil in order to measure the temperature of the coil, the varnish is interposed between the thermistor 350 and the coil, and thus, thermal coupling between the thermistor 350 and the coil becomes sparse. The varnish is prevented from adhering to the thermistor 350, and thus, the thermal coupling between the thermistor 350 and the coil is tight. Accordingly, the thermistor 350 can measure a correct temperature of the coil.

As described above, since the method for manufacturing the stator 300 according to the present embodiment includes the first step of causing the temperature difference in the stator core 305 such that an injection side (the welded end side as an upper side) has a first temperature (gelling temperature range) and an opposite side (the non-welded end side as a lower side) of the injection side has a second temperature (high-speed filling temperature range) and the second step of injecting the resin member (varnish) from the injection side in a state in which this temperature difference is maintained, the filling rate of the varnish in the slot 310 can be increased. It is possible to prevent the varnish from flowing out from the lower side of the stator core 305, and it is possible to suppress the adhesion of the varnish to the varnish adhesion prohibited locations (the connection terminal 340, the thermistor 350, and the like).

In the second step, since the resin member is injected in a state in which the shaft of the stator core 305 is tilted from the vertical, the inflow rate of the resin member can be controlled.

In the second step, since the resin member is injected while rotating, revolving, or swinging the stator core 305 around the shaft, the varnish can be injected uniformly in the circumferential direction. The residual bubbles can be suppressed and the varnish can be filled with a high filling rate.

In the stator core 305 manufactured by the manufacturing method according to the present embodiment, in the slot 310, a region (high filling range) in which the filling rate of the resin member is high is formed on the injection side (from the upper portion to the intermediate portion) and a region (varnish stop range) in which the filling rate thereof is low is formed on the opposite side (lower portion) of the injection side. In the high filling range, since there are few bubbles between the stator core 305 and the coil, the heat generated in the coil is easily released, the vibration of the coil can be suppressed, and the characteristics of the rotary electric machine can be stabilized.

The present invention is not limited to the aforementioned embodiment, and includes various modification examples and equivalent configurations within the gist of the appended claims. For example, the aforementioned embodiment is described in detail in order to facilitate easy understanding of the present invention, and the present invention is not limited to necessarily include all the described components. A part of the configuration of one embodiment may be replaced with the configuration of another embodiment. The configuration of another embodiment may be added to the configuration of one embodiment. Another configuration may be added, removed, and substituted to, from, and for some of the configurations of the aforementioned embodiments.

REFERENCE SIGNS LIST 200 rotary electric machine
205 housing
300 stator

305 stator core
307 teeth
307 teeth core
310 slot
340 connection terminal
350 thermistor
510 stator coil
512 segment coil
520 slot liner

The invention claimed is:

1. A method for manufacturing a stator of a rotary electric machine, the stator having a coil and a stator core in which a slot that houses the coil is formed, and a resin member of which viscosity is low at a first temperature and the viscosity is high at a second temperature higher than the first temperature being filled in the slot from an injection side, the manufacturing method comprising:
 a first step of causing a temperature difference in the stator core such that the injection side becomes the first temperature and an opposite side of the injection side becomes the second temperature; and
 a second step of injecting the resin member from the injection side in a state in which the temperature difference is maintained.

2. The manufacturing method according to claim 1, wherein, in the second step, the resin member is injected in a state in which a shaft of the stator core is tilted from the vertical.

3. The manufacturing method according to claim 1, wherein, in the second step, the resin member is injected while rotating, revolving, or swing the stator core around a shaft.

4. The manufacturing method according to claim 1, wherein, in the slot, a region in which a filling rate of the resin member is high is formed on the injection side, and a region in which the filling rate is low is formed on the opposite side of the injection side.

* * * * *